United States Patent
Koeneman (10) Patent No.: US 6,833,645 B2
(45) Date of Patent: Dec. 21, 2004

(54) MICRO-ELECTROMECHANICAL VOLTAGE CONVERTER

(75) Inventor: Paul B. Koeneman, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 101 days.

(21) Appl. No.: 10/231,499

(22) Filed: Nov. 18, 2002

(65) Prior Publication Data

US 2004/0095031 A1 May 20, 2004

(51) Int. Cl.[7] .............................................. H02K 49/00
(52) U.S. Cl. .................................... 310/100; 310/178
(58) Field of Search .............................. 310/100, 102 A, 310/114, 178, 268

(56) References Cited

U.S. PATENT DOCUMENTS

| | | | | |
|---|---|---|---|---|
| 3,657,580 A | * | 4/1972 | Doyle | 310/52 |
| 3,670,187 A | * | 6/1972 | Thum | 310/10 |
| 4,271,369 A | * | 6/1981 | Stillwagon | 310/178 |
| 4,499,392 A | * | 2/1985 | Giacoletto | 310/178 |
| 5,212,418 A | * | 5/1993 | Mason | 310/114 |
| 5,241,232 A | * | 8/1993 | Reed | 310/178 |
| 5,451,825 A | | 9/1995 | Strohm | |
| 5,481,149 A | | 1/1996 | Kambe et al. | |
| 5,530,309 A | | 6/1996 | Weldon | |
| 5,587,618 A | * | 12/1996 | Hathaway | 310/178 |
| 5,783,879 A | | 7/1998 | Furlani et al. | |
| 5,821,659 A | | 10/1998 | Smith | |
| 5,822,839 A | | 10/1998 | Ghosh et al. | |
| 6,051,905 A | | 4/2000 | Clark | |

FOREIGN PATENT DOCUMENTS

WO   WO 95/08210   3/1995

OTHER PUBLICATIONS

U.S. patent application Ser. No. 10/231,912, Koeneman, filed Aug. 29, 2002.
U.S. patent application Ser. No. 10/231,498, Koeneman, filed Aug. 29, 2002.
U.S. patent application Ser. No. 10/270,993, Koeneman, filed Oct. 15, 2002.

* cited by examiner

Primary Examiner—Thanh Lam
(74) Attorney, Agent, or Firm—Sacco & Associates, PA (57) ABSTRACT

The invention concerns a method and device for using a homopolar machine to convert a first DC voltage to a second DC voltage. According to the method, the invention can include the steps of applying a first DC voltage between an inner and outer radial portion of a primary conductive disc comprising a rotor to produce an electric current, applying a magnetic field aligned with an axis of the rotor to induce a rotation of the rotor about the axis responsive to the electric current, and coupling the rotation of the rotor to at least one secondary conductive disc disposed in the magnetic field to produce at least a second DC voltage between an inner and outer radial portion of the secondary conductive disc or discs.

28 Claims, 4 Drawing Sheets

MICRO-ELECTROMECHANICAL VOLTAGE CONVERTER

BACKGROUND OF THE INVENTION

1. Statement of the Technical Field

The inventive arrangements relate generally to methods and apparatus for providing voltage conversion, and more particularly efficient variable DC to DC voltage conversion in a small volume.

2. Description of the Related Art

Conversion of a first DC voltage to second DC voltage has always been problematic. Unlike AC voltages that can be efficiently stepped up or down using simple transformers, circuits for converting DC voltages are generally more complex. Such systems tend to occupy a large volume, have noise problems, and/or operate relatively inefficiently. For example, one approach for solving the DC to DC conversion problem is the DC-AC-AC-DC converters. In such systems, a DC voltage is first converted to an AC voltage, then stepped up or down using conventional AC transformer techniques, and finally converted back to DC. This approach is relatively expensive and requires transformers that can add weight and bulk to a design.

Buck and Boost type switching converters can also be used for DC voltage conversion. However, each of these designs also suffers from problems. Pulsating input currents in Buck converters tend to send too much noise back to the source. Also, these devices tend to suffer from poor line regulation. Similarly, pulsating output currents with Boost converters are known to result in noise problems.

Another approach that has been used to solve the DC to DC conversion problem makes use of a Single-Ended Primary Inductance Converter (SEPIC). However, the SEPIC device also tends to suffer from noise problems. Further, these converters can suffer from reduced efficiencies at lower voltages. Accordingly, there is a need for compact variable DC to DC voltage conversion system that efficiently converts DC voltages with low noise and good isolation.

Homopolar machines are well known in the art. For example, several variations of such machines are described in U.S. Pat. No. 5,530,309 to Weldon, U.S. Pat. No. 5,481,149 to Kambe, U.S. Pat. No. 5,587,618 to Hathaway. These patents describe the use of a homopolar generator for producing high current, low voltage energy for various applications. U.S. Pat. No. 6,051,905 to Clark describes a homopolar machine for use in conjunction with storage batteries for an electric car. In general, however, such references have not applied homopolar machines to the problem of converting one DC voltage to a second DC voltage.

U.S. Pat. No. 5,821,659 to Smith describes a homopolar transformer for conversion of electrical energy. However, the device is mechanically complex and therefore relatively unsuited for micro-electronic fabrication on a substrate.

SUMMARY OF THE INVENTION

The invention concerns a method and device that makes use of a homopolar machine for converting a first DC voltage to a second DC voltage. According to the method, the invention can include the steps of applying a first DC voltage between an inner and outer radial portion of a primary conductive disc comprising a rotor to produce an electric current, applying a magnetic field aligned with an axis of the rotor to induce a rotation of the rotor about the axis responsive to the electric current, and coupling the rotation of the rotor to at least one secondary conductive disc disposed in the magnetic field to produce at least a second DC voltage between an inner and outer radial portion of the secondary conductive disc or discs.

The method can also include the step of controlling a ratio of the first DC voltage to the second DC voltage by selectively controlling the strength of the magnetic field applied to at least a portion of one of the conductive discs. Alternatively, or in addition thereto, the method can comprise the step of controlling a ratio of the first DC voltage to the second DC voltage by selectively controlling a radial spacing between the inner and outer radial portions of the secondary conductive disc or discs relative to the spacing between the inner and outer radial portion of the primary conductive disc.

The method can be carried out by axially aligning the secondary conductive disc or discs with the primary conductive disc, and coupling the rotation of the rotor to the secondary conductive discs, for example through a common axle. The magnetic field can be applied by positioning at least one permanent magnet adjacent to the rotor. Alternatively, or in addition thereto the magnetic field can be applied by positioning one or more electromagnets adjacent to the rotor. A ratio of the first DC voltage to the second DC voltage can be controlled by selectively controlling an electric current applied to the electromagnets.

According to one aspect of the invention, a different intensity magnetic field can be selectively applied outside a perimeter of a smaller one of the conductive discs as compared to inside the perimeter so as to control a ratio of the first DC voltages to the second DC voltage or voltages.

The invention can also include a device, for example a micro-electromechanical device for converting a first DC voltage to a second DC voltage or voltages. The device can include a primary conductive disc rotatably mounted to a rotor support structure. DC voltage input leads can be provided integrated with the substrate and coupled to a primary set of brushes for applying the first DC voltage between an inner and outer radial portion of the primary conductive disc to produce an electric current. A magnetic field source is provided for producing a magnetic field aligned for causing a rotation of the primary conductive disc responsive to the electric current. One or more secondary conductive discs is mechanically coupled to the primary conductive discs for rotation responsive to the rotation of the primary conductive disc. A diameter of the primary conductive disc can be the same size or different size as compared to a diameter of the secondary conductive disc(s). An insulator preferably electrically isolates the primary and secondary conductive discs. The secondary conductive disc (s) can also be disposed within the magnetic field for generating the second DC voltage responsive to the rotation. DC voltage output leads are provided coupled to secondary set of brushes forming an electrical connection to an inner and outer radial portion of the secondary conductive disc. If the device is formed as a micro-electromechanical device, the substrate can be a ceramic or semiconductor material.

The magnetic field is aligned parallel with an axis of rotation for each of the primary and secondary conductive discs. According to one aspect of the device, the primary and secondary conductive discs can have a common axis of rotation. According to another aspect of the invention, the magnetic field for at least a portion of one of the primary and secondary conductive discs can have an intensity that is different as compared to an intensity field applied to the other one of the primary and secondary conductive discs.

A control circuit can be provided coupled to the magnetic field source for selectively controlling the intensity of the magnetic field applied respectively to at least a portion of each of the conductive discs. For example, the control circuit can control a current applied to an electromagnet for controlling the field intensity.

BRIEF DESCRIPTION OF THE DRAWINGS

FIGS. 7a–7h is a series of drawings useful for understanding how the device in FIGS. 1 and 6 can be fabricated in a silicon substrate.

DETAILED DESCRIPTION OF THE PREFERRED EMBODIMENTS

Figure 1:
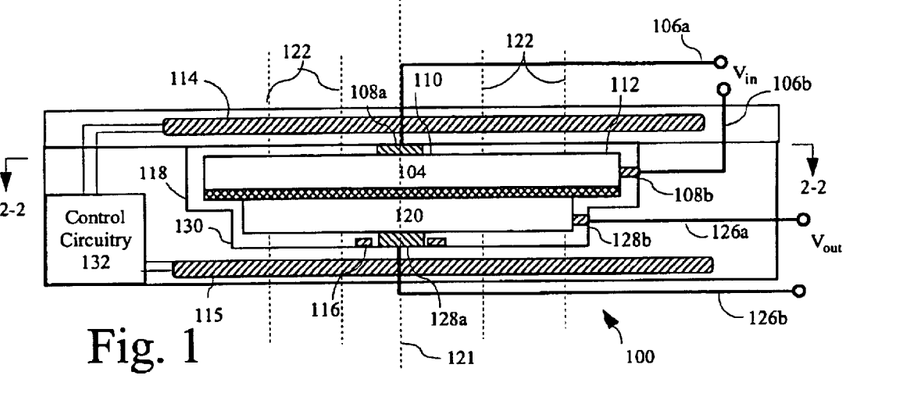
FIG. 1 is a partial cross-sectional view of a DC to DC homopolar voltage conversion device.
Figure 2:
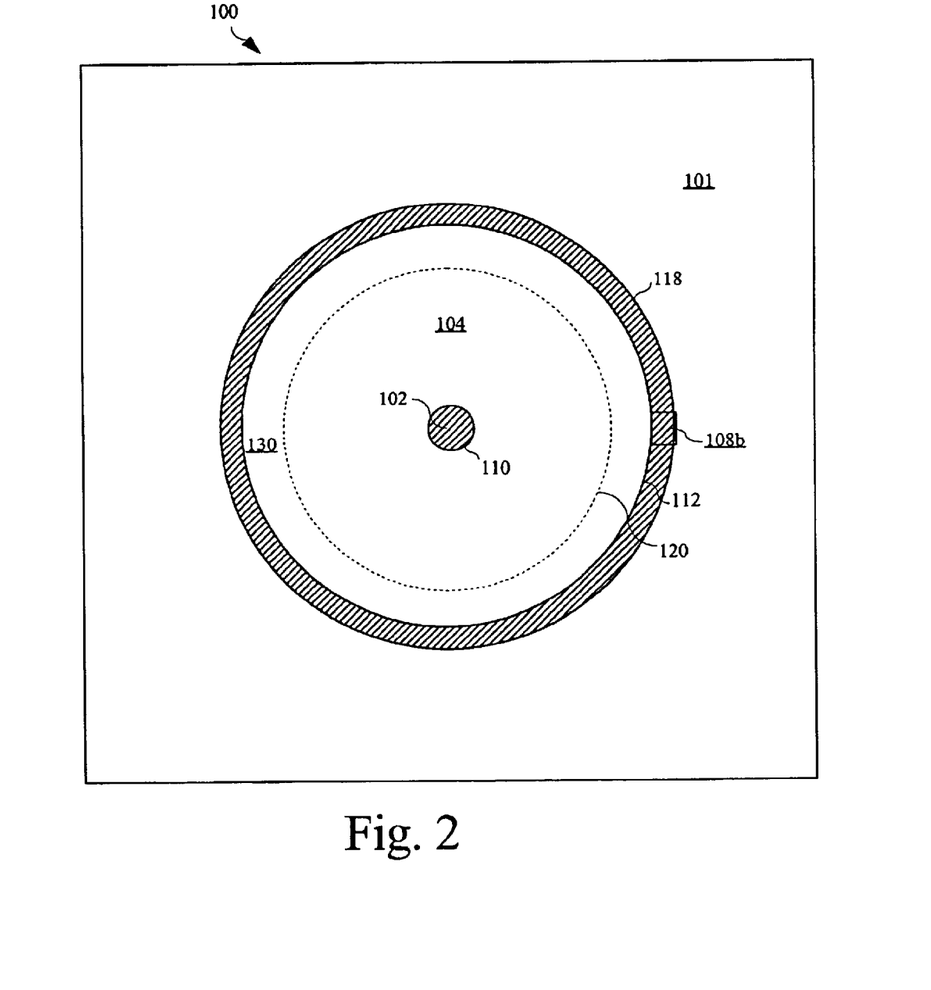
FIG. 2 is a top view of the device of FIG. taken along line 2—2.

A homopolar machine for converting a first DC voltage to a second DC voltage is illustrated in FIGS. 1 and 2. The device 100 includes a primary conductive disc 104 rotatably mounted on a support structure 101. The support structure is preferably a ceramic or semiconductor substrate but the invention is not so limited. According to one aspect of the invention, the support structure can comprise a portion of a planar circuit board or semiconductor device on an integrated circuit and the primary conductive disc can be mounted within a circular recess 118 formed within the substrate.

The primary conductive disc 104 can rotate about a fixed rotor support 102 or, in an alternative configuration, the rotor support 102 can be fixed to the primary conductive disc 104 and the entire assembly can rotate in a bushing 116. DC voltage input leads 106a and 106b are provided and can be integrated with the substrate forming the support structure 101. The input leads preferably form a conductive contact with a primary set of brushes 108a and 108b respectively. Brush 108a can be integrated with the rotor support 102 or may be formed adjacent thereto. Brush 108b is preferably formed at or near an outer peripheral portion of a circular recess 118. In this way, a first DC voltage Vin can be applied between an inner 110 and outer 112 radial portion of the primary conductive disc 104 to produce an electric current Iin. Notably, the location of the brushes 108a and 108b are shown making contact with the primary conductive disc 104 at an extreme inner and outer radial portion thereof, the invention is not so limited and other configurations are also possible.

A magnetic field source 114 can be provided for producing a magnetic field 122 aligned as shown in FIG. 1 for causing a rotation of the primary conductive disc 104 responsive to the electric current Iin. The magnetic field source 114 can be comprised of a permanent magnet or an electromagnet positioned adjacent to the conductive disc 104 as shown. Alternatively, or in addition thereto, a magnetic field source 115 can be provided below the primary conductive disc 104 as shown. Magnetic field source 115 can likewise comprise a permanent magnet or electromagnet.

At least one secondary conductive disc 120 is preferably provided and mechanically coupled to the primary conductive discs 104 for rotation responsive to the rotation of the primary conductive disc. As best seen in FIG. 1, the primary and secondary conductive discs can have a common axis of rotation 121. A diameter of the primary conductive disc 104 can be the same or different as compared to a diameter of the secondary conductive disc 120. The relative diameter of the conductive discs 104, 120 can be used as one means for controlling the ratio of the input voltage Vin to the output voltage Vout. For a given magnetic field intensity and rotational velocity, a smaller diameter secondary conductive disc 120 will generally produce a lower output voltage.

The primary and secondary conductive discs are preferably electrically isolated from one another by an insulating layer 124. The insulating layer 124 isolates the input voltage $V_{in}$ from the output voltage $V_{out}$. The insulating layer 124 also provides current isolation between the primary and secondary discs. Nonetheless, the insulating layer 124 is not necessary in all applications. As best seen in FIG. 1, the secondary conductive disc 120 can also be disposed within the magnetic field 122. Consequently, when the rotation of primary conductive disc 104 is coupled to secondary conductive disc 120, the secondary conductive disc will generate a second DC voltage Vout responsive to the rotation.

DC voltage output leads 126a and 126b form an electrical contact with a secondary set of brushes 128a, 128b. The brushes provide an electrical connection to an inner and outer radial portion respectively of the secondary conductive disc 120. Brush 128a can be integrated with or can be positioned adjacent to the rotor support 102. Brush 128b is preferably formed at or near an outer peripheral portion of a circular recess 130. Notably, the location of the brushes 128a and 128b are shown making contact with the secondary conductive disc 104 at an extreme inner and outer radial portion thereof, but the invention is not so limited and other configurations are also possible.

Notably, while only a single secondary conductive disc 120 is shown in FIG. 1, the invention is not so limited. Thus, additional secondary conductive discs can be stacked above or below the primary conductive disc 104 in a manner similar to the arrangement shown with respect to conductive disc 120. Each of the secondary conductive discs 120 can have associated brushes 128a, 128b. The additional secondary conductive discs can be of various diameters as may be appropriate for producing selected DC output voltages.

According to one aspect of the invention, the magnetic field source 114, 115 can be configured to produce a magnetic field 122 that is generally constant with time and over the entire area circumscribed by the outermost perimeter of the conductive discs 104, 120. However, the invention is not so limited. For example, one or both of the magnetic field sources 114, 115 can be configured to produce a more or less intense magnetic field over a selected portion of the area occupied by one of the conductive discs to control the ratio over the input and output voltage.

For example, one or both of the magnetic field sources 114, 115 can be configured so that the magnetic field 122 is of a greater intensity in an annular area 130 defined between the outer perimeter of the secondary conductive disc 120 and the outer perimeter of the primary conductive disc 104. In FIGS. 1 and 2, an increase of magnetic flux density in this area can be used to increase the rate of rotation for the primary conductive disc 104 for a constant input current. This will cause a corresponding increase in the rate of rotation of the secondary conductive disc, and this increased rotational velocity will cause an increase in voltage output from the secondary conductive disc. if one or both of the magnetic field sources 114, 115 is an electromagnet, the intensity of the magnetic field in selected areas can be varied over time to control the voltage output from the secondary conductive disc 120. Control circuitry 132 can be provided for selectively controlling the field intensity produced by the electromagnets in the selected regions. For example, the control circuit can control a current applied to an electromagnet for controlling the field intensity. In another arrangement, microactuators can be provided to physically move a permanent magnet closer to, or farther from, the rotor to vary the field intensity at the rotor. For example, a microelectromechanical actuator can be provided. In particular, an electrostatic actuator can be used when a voltage controlled actuator is desired, or a thermal actuator can be used when a current controlled actuator is desired. Both types of actuators are known to the skilled artisan.

FIGS. 1 and 2 illustrate one configuration by which the primary conductive disc can be mechanically coupled to the secondary conductive disc for imparting a rotational moment. However, it should be understood that the invention is not so limited. Instead, the invention is intended to encompass any of a wide variety of possible mechanical arrangements by which the first conductive disc can transfer a rotational moment to the secondary conductive disc. These can include, without limitation, gear drives, belt drives, and hydraulic drive systems. For example, an alternative embodiment of the invention is illustrated in FIGS. 3 and 4.

Figure 3:
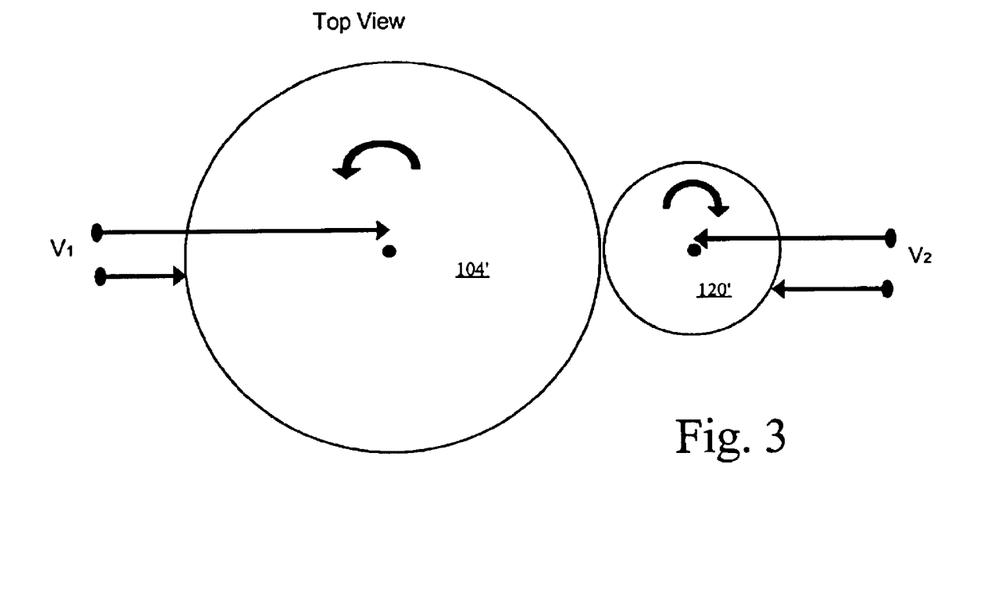
FIG. 3 is a top view of a first alternative embodiment of the invention.
Figure 4:
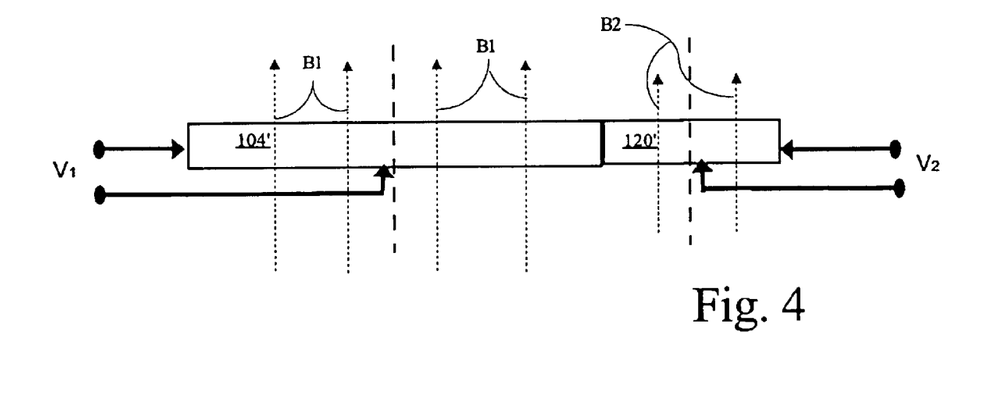
FIG. 4 is a side view of the first alternative embodiment of FIG. 3.

Similar to the previously described embodiment of FIGS. 1 and 2, the rotational energy of the device in FIGS. 3 and 4 can be coupled from a primary conductive disc 104' to a secondary conductive disc 120' by means of a radial edge drive system. More particularly, the peripheral edge of the primary conductive disc can be positioned to engage a peripheral edge of the secondary conductive disc. In this configuration, counter-clockwise rotation of the primary conductive disc will result in a clockwise rotation of the secondary conductive disc.

In FIGS. 3 and 4, each of the conductive discs can be exposed to a magnetic field B1, B2 as illustrated in FIG. 4. The fields B1 and B2 can be the same or different intensity. Thus, the arrangement of FIGS. 3 and 4 can permit the ratio of the input to output voltage to be controlled by simply varying the relative strength of each of the magnetic fields B1, B2. The configuration in FIGS. 3 and 4 is more versatile in some respects as compared to the embodiment in FIGS. 1 and 2 because the side-by-side configuration provides greater capacity for varying the voltage ratio since the magnetic field can be varied over the entire rotor rather than just an outer annulus. Further, the input and output voltages are not referenced to one another when there is an insulating layer at the outer radius of one or more rotors.

Figure 5:
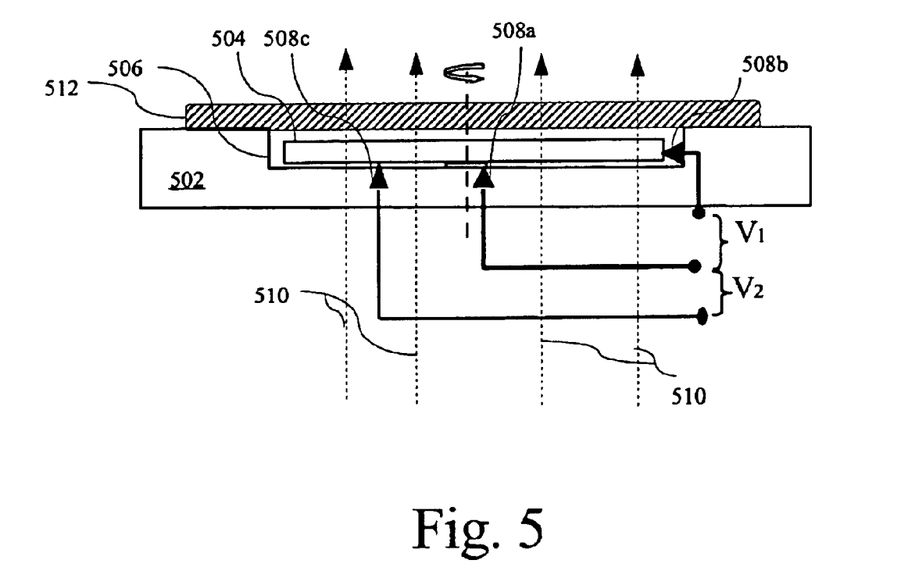
FIG. 5 is a side view of a second alternative embodiment of the invention.
Figure 6:
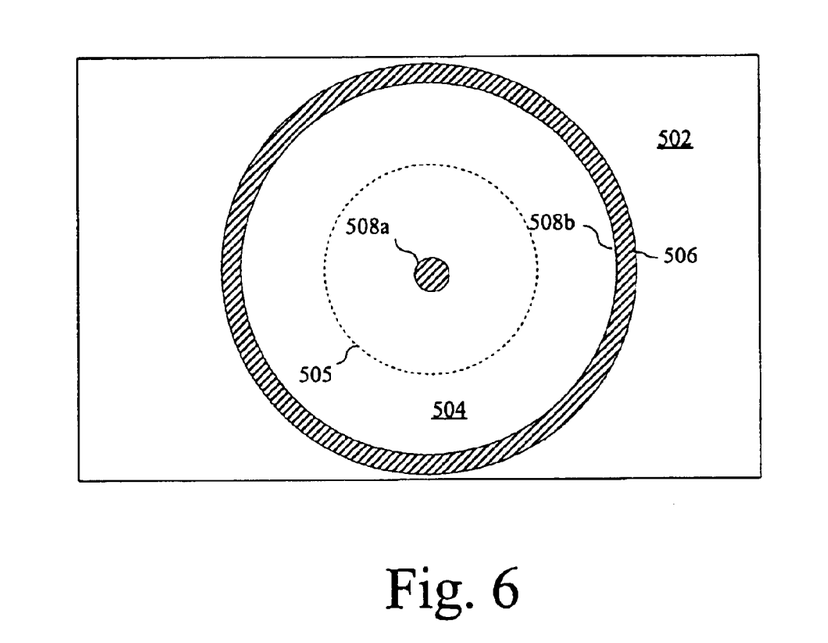
FIG. 6 is a top view of the embodiment of FIG. 5

FIGS. 5 and 6 illustrate an alternative embodiment of the invention in which the secondary disc 505 is formed as an integral part of the primary conductive disc 504. In this arrangement, the primary conductive disc 504 is rotatably mounted within a circular recess 506 of the substrate 502 in a manner similar to that described relative to FIGS. 1 and 2. A magnetic field source 512 is used to produce a magnetic field 510 that is aligned with the axis of rotation of conductive disc 504. A primary set of brushes 508a and 508b can be fixed respectively at an inner and outer radial portion of the conductive disc and define the working radius of the primary conductive disc 504. A third brush 508c is provided that can be moved radially across the surface of the primary conductive disc. The third brush 508c and one of the fixed brushes, such 508a, can comprise the secondary set of brushes, 508a being a shared brush. The position of the movable brush 508c relative to fixed brush 508b defines inner and outer radial portions of the secondary conductive disc 505 and the working radius of the secondary conductive disc 505.

The movable brush 508c can be implemented by any suitable means. For example the movable brush 508c can be mounted on a slider with a microactuator. For example, an electrostatic actuator or a thermal actuator can be used.

With the arrangement described above in FIGS. 5 and 6, an input voltage at V1 applied between brushes 508a and 508b will cause a rotation of the conductive disc 504. This rotation will cause a voltage V2 to be induced between brushes 508a and 508c. The ratio of V1 to V2 will be determined by the relative spacing between 508a and 508b as compared to the spacing between 508a and 508c. In one arrangement, the magnetic field strength between brushes 508b and 508c can be varied relative to the magnetic field strength between brushes 508a and 508c, or vice versa, to produce a variable voltage ratio. The ratio V2/V1 is equal to the percentage of the total magnetic flux passing inside the radius of 508c 505.

The foregoing FIGS. 1–6 illustrate three possible configurations in which a homopolar device can be implemented to convert one DC voltage to a second DC voltage. Those skilled in the art will recognize that the invention is not limited to those specific embodiments shown. Similarly, these devices can also serve as current converters. At steady state, the output power will equal the input power (minus a small amount of parasitic loss). This means if the output voltage is half the input voltage, the output current will be approximately twice the input current.

According to a preferred embodiment, the invention can be implemented as a micro-electronic machine formed in a ceramic or semiconductor substrate. For example, low temperature co-fired ceramic (LTCC), silicon, gallium arsenide, gallium nitride, germanium, indium phosphide, or any other substrate material suitable for a micro-electromechanical manufacturing process can be used to manufacture the invention. In particular, the simple structure of the devices is uniquely well suited Polysilicon microfabrication, which is well known to those skilled in the art. One such technique is disclosed in David A. Koester et al., MUMPs Design Handbook (Rev. 7.0, 2001). An exemplary polysilicon microfabrication process is shown in FIGS. 7a–7h. It should be noted, however, that the invention is not limited to the process disclosed herein and that other ceramic and semiconductor microfabrication processes can be used. Further, FIGS. 7a–7h correspond to the fabrication of the device in FIGS. 1 and 2 but it will be understood that similar techniques could be used for the devices in FIGS. 3–6.

Figure 7A:
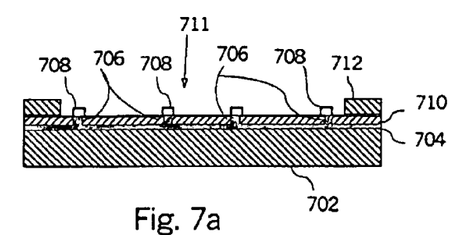

Referring now to FIG. 7a, a first silicon substrate layer (first silicon layer) 702 can be provided to begin forming a wafer structure for the micro-electromechanical voltage converter, for example, a silicon wafer typically used in IC manufacturing. It may be desirable for the first silicon layer 702 to have electrically insulating properties. Accordingly, the first silicon layer 702 can be formed without doping or have only a light doping. Alternatively, an electrically insulating layer can be applied over the first silicon layer 702. For example, a layer of silicon dioxide can be applied over the first silicon layer 702. A conductive layer can be deposited onto the substrate, from which circuit traces 704 can be etched. For example, a conductive layer of doped polysilicon or aluminum can be deposited onto the substrate. After deposition of the conductive layer, conductive traces 704 can be defined using known lithography and etching techniques.

After the circuit traces are formed, an electrically insulating layer 710, such as silicon nitride (SiN), can be deposited over the first substrate and circuit traces. For example, low pressure chemical vapor deposition (LPCVD) involving the reaction of dichlorosilane (SiH2Cl2) and ammonia (NH3) can be used to deposit an insulating layer. A typical thickness for the SiN layer is approximately 600 nm.

Vias 706 then can be formed through the insulating layer 710 and filled with electrically conductive material (e.g. Aluminum) to electrically contact the circuit traces 704 at desired locations. Contact brushes 708 then can be deposited on the vias 706 so that the contact brushes 708 can be electrically continuous with the respective vias 706. Accordingly, the electrical contact brushes are electrically continuous with respective ones of circuit traces 704. Two axial contact brushes and two radial edge contact brushes are shown in the figure, but additional axial and radial edge contact brushes can be provided. Further, the contact brushes can include any conductive material suitable for use in a contact brush, for example a carbon nano composite, which can be applied using a thermo spray method commonly known to the skilled artisan. In another arrangement the contact brushes can be a conductive liquid.

A first structural layer of polysilicon (poly 1) 712 can be deposited onto the insulating layer 710 using LPCVD. The poly 1 layer then can be etched to form a radial aperture 711 which exposes the contact brushes. In an alternate arrangement, the aperture region can be masked prior to application of the poly 1 layer 712, thereby preventing deposition in the aperture region.

Figure 7B:
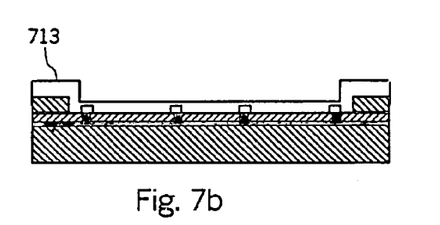

Referring to FIG. 7b, a first sacrificial layer 713, for example silicon dioxide ($SiO_2$) or phosphosilicate glass (PSG), can be applied to the substrate over the previously applied layers. The first sacrificial layer 713 is removed at the end of the process, as is further discussed below. The sacrificial layer can be deposited by LPCVD and annealed to the circuit. For example, in the case that phosphosilicate glass (PSG) is used for the sacrificial layer, the sacrificial layer can be annealed at 1050° C. in argon. The first sacrificial layer 713 then can be planarized within the aperture 711 using a planarizing etch-back process to form a flat base within the aperture 711 that is recessed from an upper elevation of the first sacrificial layer.

Figure 7C:
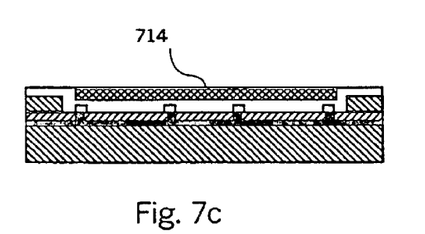

Referring to FIG. 7c, a first conductor then can be deposited into the aperture 711 to form a first conductive disc (first disc) 714 having opposing upper and lower surfaces. Further, the first disc 714 can be wholly contained within the aperture 711 so that the only material contacting the first disc 714 is the sacrificial layer 713. The thickness of the first disc 714 can be determined by the thickness of the first sacrificial layer 713 and the amount of etch-back applied to the aperture 711.

Figure 7D:
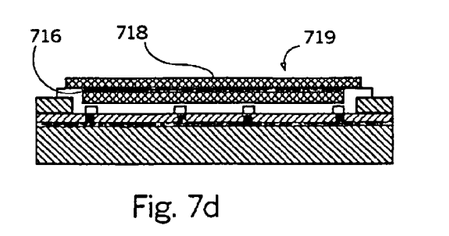

Referring to FIG. 7d, a second conductor can be deposited onto the first disc 714 to form a conductive disc (second disc) 718 to form a rotating assembly 719. Notably, mechanical characteristics, such as rigidity, should be considered when selecting a thickness of the rotating assembly 719. Further, in one arrangement, an insulator layer 716, for example SiN, can be formed over the first disc 714 prior to the deposition of the second disc 718. Importantly, the insulator layer 716 can provide voltage and current isolation between the first disc 714 and the second disc 718.

Figure 7E:
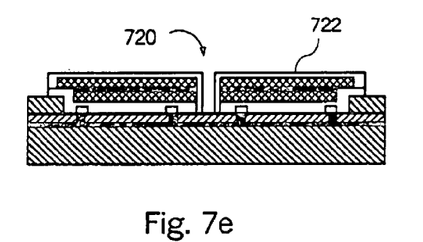

A second aperture 720 then can be etched through an axial region of the rotating assembly 719 and through the first sacrificial layer below the center of the disc to expose the electrically insulating layer 710, as shown in FIG. 7e. The second aperture 720 can be sized to form a hole in the rotating assembly 719 having a radius equal to or smaller than the radial distance between opposing inner most contact brushes 708. Known etching techniques can be used, for example reactive ion etch (RIE), plasma etching, etc. A second sacrificial layer 722, for example $SiO_2$ or PSG, then can be deposited over all exposed surfaces of the rotating assembly 719. Importantly, a region of the electrically insulating layer 710 should be masked during the application of the second sacrificial layer 722 to prevent the second sacrificial layer 722 from adhering to the electrically insulating layer 710 within the second aperture 720. Alternatively, a subsequent etching process can be performed to clear away the second sacrificial layer from the electrically insulating layer 710.

Figure 7F:
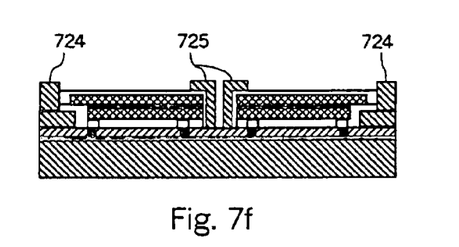

In FIG. 7f, using LPCVD, a second layer of polysilcon (poly 2) 724 can be deposited over the previously applied layers, for example the poly 1 layer 712 surrounding the first disc 714, thereby adding an additional silicon structure. Notably, the poly 2 layer 724 also can fill the second aperture 720. A washer shaped region then can be etched to remove a washer shaped portion of the poly 2 layer located above the rotating assembly 719. Notably, the inner radius of the washer shaped region can be larger than the inner radius of the rotating assembly 719. Accordingly, the etching of the poly 2 layer 724 can leave a structure 725, having a "T" shaped cross section, within the second aperture 720. An upper portion of the structure 725 can extend over the inner portion of the rotating assembly 719, thereby limiting vertical movement of the rotating assembly 719 once the sacrificial layers are removed. Further, the structure 725 can operate as a bearing around which the rotating assembly 719 can rotate. Alternatively, electromagnetic or electrostatic bearings can be provided in the second aperture 720.

Figure 7G:
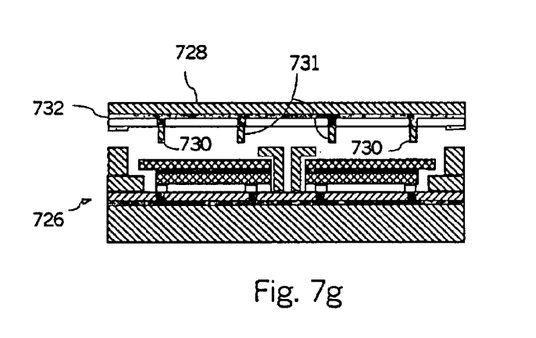

Referring to FIG. 7g, the first and second sacrificial layers 713 and 722 then can be released with a hydrogen fluoride (HF) solution as is known to the skilled artisan. For example, the wafer structure 726 can be dipped in an HF bath. HF does not attack silicon or polysilicon, but quickly etches SiO2. Notably, the HF can etch deposited SiO2 approximately 100× faster than SiN. The release of the sacrificial layers 713 and 722 enables the rotating assembly 719, and in particular the first disc 714, to rest upon, and make electrical contact with, contact brushes 708. Moreover, the release of the sacrificial layers 713 and 722 frees the rotating assembly 719 to rotate about its axis.

A second wafer structure 728 is aligned with the wafer structure 726 for final assembly. The second wafer structure includes brushes 730 and 731 and conductive trace layers 732, which can be formed in the same manner as equivalent layers in the first wafer structure 716. Importantly, the contact brushes 730 and 731 can be positioned to electrically contact the second disk 718 of the rotating assembly 719 when the second wafer structure 728 is assembled to the first wafer structure 726. Further, the bonding of the second wafer structure 728 to the first wafer structure 726 can provide an enclosed region in which the rotating assembly 719 can rotate. In particular, the enclosed region can be sealed to keep out dust and other contaminants, which can reduce the efficiency of the micro-electromechanical voltage converter.

The assembly is completed in by securing a magnet layer 734 over the disc assembly as shown. The magnet 734 can be fixed above and/or below the rotating assembly 719 to provide a magnetic field aligned with the axis of rotation of the rotating assembly 719. For example a magnet can be attached to the top of the second wafer structure 728. Further, a magnet can be attached to the bottom of the first wafer structure 726, for example with a third silicon substrate layer.

What is claimed is:

1. A method for converting a first DC voltage to a second DC voltage using a homopolar machine comprising the steps of:
    applying a first DC voltage between an inner and outer radial portion of a primary conductive disc comprising a rotor to produce an electric current;
    applying a magnetic field aligned with an axis of said rotor to induce a rotation of said rotor about said axis responsive to said electric current; and
    coupling said rotation of said rotor to a secondary conductive disc disposed in said magnetic field to produce a second DC voltage between an inner and outer radial portion of said secondary conductive disc.

2. The method according to claim 1 further comprising the step of controlling a ratio of said first DC voltage to said second DC voltage by selectively controlling the strength of said magnetic field applied to at least a portion of one of said conductive discs.

3. The method according to claim 1 further comprising the step of controlling a ratio of said first DC voltage to said second DC voltage by selectively controlling a radial spacing between said inner and outer radial portions of said secondary conductive disc relative to said inner and outer radial portion of said primary conductive disc.

4. The method according to claim 1 further comprising the step of axially aligning said secondary conductive disc with said primary conductive disc.

5. The method according to claim 4 further comprising the step of coupling said rotation of said rotor to said secondary conductive disc through a common axle.

6. The method according to claim 1 further comprising the step of applying said magnetic field by positioning at least one permanent magnet adjacent to said rotor.

7. The method according to claim 1 further comprising the step of applying said magnetic field by positioning at least one electro-magnet adjacent to said rotor.

8. The method according to claim 7 further comprising the step of controlling a ratio of said first DC voltage to said second DC voltage by selectively controlling an electric current applied to said at least one electro-magnet.

9. The method according to claim 1 further comprising the step of selectively applying a different intensity magnetic field outside a perimeter of a smaller one of said conductive discs as compared to inside said perimeter so as to control a ratio of said first DC voltage to said second DC voltage.

10. The method according to claim 1 further comprising the step of fabricating said rotor on a substrate.

11. A micro-electromechanical homopolar device for converting a first DC voltage to a second DC voltage comprising:
    a primary conductive disc rotatably mounted on a substrate;
    DC voltage input leads integrated with said substrate and coupled to a primary set of brushes for applying said first DC voltage between an inner and outer radial portion of said primary conductive disc to produce an electric current;
    a magnetic field source producing a magnetic field aligned for causing a rotation of said primary conductive disc responsive to said electric current;
    a secondary conductive disc mechanically coupled to said primary conductive disc for rotation responsive to said rotation of said primary conductive disc, and disposed within said magnetic field for generating said second DC voltage responsive to said rotation; and
    DC voltage output leads coupled to a secondary set of brushes forming an electrical connection to an inner and outer radial portion of said secondary conductive disc.

12. The device according to claim 11 wherein said primary and secondary conductive discs have a common axis of rotation.

13. The device according to claim 11 wherein said secondary conductive disc secondary disc is formed as an integral part of the primary conductive disc.

14. The device according to claim 11 wherein said magnetic field is aligned parallel with an axis of rotation for each of said primary and secondary conductive discs.

15. The device according to claim 11 wherein said magnetic field for at least a portion of one of said primary and secondary conductive discs has an intensity that is different as compared to an intensity field applied to at least a portion of the other one said primary and secondary conductive discs.

16. The device according to claim 11 further comprising a control circuit coupled to said magnetic field source for selectively controlling an intensity of said magnetic field applied respectively to at least a portion of one of said conductive discs.

17. The device according to claim 11 wherein a diameter of said primary conductive disc is a different size as compared to a diameter of said secondary conductive disc.

18. The device according to claim 11 wherein said substrate is at least one of a ceramic and a semiconductor substrate and at least one of said conductive discs rotates within a circular recess formed within said substrate.

19. The device according to claim 11 wherein said primary and secondary conductive discs are electrically isolated by an insulator.

20. A homopolar device for converting a first DC voltage to a second DC voltage comprising:
    a primary conductive disc rotatably mounted in a support structure;
    a primary set of brushes for applying said first DC voltage between an inner and outer radial portion of said primary conductive disc to produce an electric current;
    a magnetic field source producing a magnetic field aligned for causing a rotation of said primary conductive disc responsive to said electric current;
    a secondary conductive disc mechanically coupled for rotation responsive to said rotation of said primary conductive disc, and disposed within said magnetic field for generating said second DC voltage responsive to said rotation; and
    a secondary set of brushes forming an electrical connection to an inner and outer radial portion of said secondary conductive disc.

21. The device according to claim 20 wherein said primary and said secondary conductive discs rotate within a circular recess formed in a planar substrate.

22. The device according to claim 21 wherein said planar substrate is formed from a material selected from the group consisting of a semiconductor and a ceramic.

23. The device according to claim 20 wherein said primary conductive disc and said secondary conductive disc have a common axis of rotation.

24. The device according to claim 20 wherein said secondary conductive disc secondary disc is formed as an integral part of the primary conductive disc.

25. The device according to claim 20 wherein said magnetic field is aligned parallel with an axis of rotation for each of said primary and secondary conductive discs.

26. The device according to claim 20 wherein said magnetic field for at least a portion of one of said primary and secondary conductive discs has an intensity that is different as compared to an intensity field applied to at least a portion of the other one said primary and secondary conductive discs.

27. The device according to claim 20 further comprising a control circuit coupled to said magnetic field source for selectively controlling an intensity of said magnetic field applied respectively to at least a portion of one of said conductive discs.

28. The device according to claim 20 wherein a diameter of said primary conductive disc is a different size as compared to a diameter of said secondary conductive disc.

* * * * *